(12) United States Patent
Chen et al.

(10) Patent No.: US 6,638,575 B1
(45) Date of Patent: Oct. 28, 2003

(54) PLASMA SPRAYED OXYGEN TRANSPORT MEMBRANE COATINGS

(75) Inventors: Jack Chieh-Cheng Chen, Getzville, NY (US); Hancun Chen, Williamsville, NY (US); Ravi Prasad, East Amherst, NY (US); Glenn Whichard, Centerville, VA (US)

(73) Assignee: Praxair Technology, Inc., Danbury, CT (US)

( * ) Notice: Subject to any disclaimer, the term of this patent is extended or adjusted under 35 U.S.C. 154(b) by 186 days.

(21) Appl. No.: 09/624,074

(22) Filed: Jul. 24, 2000

(51) Int. Cl.$^7$ ................................................. C23C 4/04
(52) U.S. Cl. ...................................... 427/453; 427/446
(58) Field of Search .................................. 427/446, 453, 427/455, 456

(56) References Cited

U.S. PATENT DOCUMENTS

| | | | |
|---|---|---|---|
| 3,617,358 A | * 11/1971 | Dittrich | 264/117 |
| 3,839,618 A | * 10/1974 | Muehlberger | 219/121 P |
| 5,240,480 A | 8/1993 | Thorogood et al. | 96/4 |
| 5,342,431 A | 8/1994 | Anderson et al. | 95/45 |
| 5,391,440 A | 2/1995 | Kuo et al. | 429/27 |
| 5,439,706 A | 8/1995 | Richards et al. | 427/244 |
| 5,478,444 A | 12/1995 | Liu et al. | 204/59 |
| 5,648,304 A | 7/1997 | Mazanec et al. | 501/134 |
| 5,702,959 A | 12/1997 | Hutter et al. | 437/31 |
| 5,702,999 A | 12/1997 | Mazanec et al. | 501/152 |
| 5,712,220 A | 1/1998 | Carolan et al. | 502/400 |
| 5,733,069 A | 3/1998 | Schofield, Jr. | 405/259.1 |
| 5,733,435 A | 3/1998 | Prasad et al. | 205/765 |
| 6,025,034 A | * 2/2000 | Strutt et al. | 427/450 |
| 6,200,541 B1 | * 3/2001 | Kleefisch et al. | 422/211 |

FOREIGN PATENT DOCUMENTS

JP     3287754     3/1992

OTHER PUBLICATIONS

Huo et al., "Synthesis of Mixed Conducting Ceramic Oxides $SrFeCo_{0.5}O_y$ by Hybrid Microwave Heating", American Ceramic Society, vol. 85, No. 2 (2002) pp 510–512, (No Month Date).

Teraoka et al., "Preparation of Dense Film of Perovskite–Type Oxide on Porous Substrate", Jour. Ceram. Soc. Japan International Ed, vol. 97, No. 55 (1989) pp 523–529, (No Month Date).

Teraoka et al., Development of Oxygen Semipermeable Membrane using Mixed Conductive Perovskite–Type Oxides (Part 1), Jour. Ceram. Soc. Japan International Ed, vol. 97 (1989) pp 458–462 (No Month Date).

Pal et al., "Electrochemical Vapor Deposition of Yttria–Stabilized Zironic Films", from Proceedings of the First International Symposium on Solid Oxide Fuel Cells, vol. 89–11 (1989) pp 41–45, (No Month Date).

* cited by examiner

Primary Examiner—Katherine A. Bareford
(74) Attorney, Agent, or Firm—David M. Rosenblum

(57) ABSTRACT

Oxygen and hydrogen transport membranes fabricated by plasma spray deposition of a micro-crack-free coating on a substrate. Also disclosed is a multi-layer composite comprising a dense or porous substrate coated with a coating provided by supersonic plasma spray deposition. Also disclosed is subsonic plasma spray deposition of single phase or dual phase nanocrystalline particles to form a crack-free oxygen transport membrane on a substrate.

5 Claims, 7 Drawing Sheets

PLASMA SPRAYED OXYGEN TRANSPORT MEMBRANE COATINGS

U.S. GOVERNMENT RIGHTS

The U.S. Government has a paid-up license in this invention and the right in limited circumstances to require the patent owner to license others on reasonable terms as provided for by the terms of Cooperative Agreement No. 70NANB5H1065 awarded by the National Institute of Standards and Technology.

FIELD OF THE INVENTION

This invention relates generally to oxygen or hydrogen transport membranes, and more specifically to oxygen or hydrogen transport membranes fabricated by plasma spray deposition of small particles of ceramic, or metal, or a combination thereof, in order to provide a micro-crack-free coating on a substrate. Also disclosed is a multi-layer composite comprising a dense or porous substrate coated with a coating provided by supersonic plasma spray deposition. Also disclosed is subsonic plasma spray deposition of single phase or dual phase nanocrystalline particles of ceramic or metal, or a combination thereof, to form a crack-free oxygen transport membrane on a substrate.

BACKGROUND OF THE INVENTION

Oxygen transport membranes ("OTMs") are useful for separating oxygen from gas mixtures containing oxygen, and the OTMs desirably are fabricated using a mixed conductor ceramic membrane, and the resulting membrane desirably has high oxygen selectivity. Illustrative ceramic compositions are disclosed in U.S. Pat. No. 5,342,431 (Anderson et al.); U.S. Pat. No. 5,648,304 (Mazanec et al.); U.S. Pat. No. 5,702,999 (Mazanec et al.); U.S. Pat. No. 5,712,220 (Carolan et al.); and U.S. Pat. No. 5,733,435 (Prasad et al.). All of these references are incorporated herein by reference in their entireties. In analogous fashion, other selective ion-transport membranes, such as hydrogen transport membranes ("HTMs") are suitably fabricated to selectively permit hydrogen to pass through the membrane while not allowing other ions to pass.

Thus, the OTMs possess the characteristic of "oxygen selectivity", meaning that only oxygen ions are transported across the membrane, with the exclusion of other elements and ions. Likewise, the HTMs possess the characteristic of "hydrogen selectivity", meaning that only hydrogen ions are transported across the membrane, with the exclusion of other elements and ions. The OTM's and HTMs can be fabricated from ceramics, or metals, or a combination thereof. Suitable ceramics for use as the membrane material include single phase mixed conductor perovskites and dual phase metal/metal oxide combinations. Particularly advantageous solid electrolyte ceramic membranes are made from inorganic oxides, typically containing calcium- or yttrium-stabilized zirconium or analogous oxides having a fluorite or perovskite structure. Exemplary ceramic compositions are disclosed in U.S. Pat. No. 5,702,959 to Mazanec et al.; U.S. Pat. No. 5,712,220 to Carolan et al.; and U.S. Pat. No. 5,733,435 to Prasad et al., all of which are incorporated herein by reference in their entirety. The use of such membranes in gas purification applications is described in U.S. Pat. No. 5,733,069 to Prasad et al., which is also incorporated herein by reference in its entirety. Particularly effective OTMs comprise dense films of perovskite-type oxides on porous substrates since these OTMs are particularly good mixed conductors. For example, a computer-simulated model of an OTM having both a dense layer and a contiguous porous layer, wherein the dense layer is said to have no connected through porosity, is disclosed in U.S. Pat. No. 5,240,480 to Thorogood et al., incorporated herein by reference in its entirety. Multilayer OTM composites having, for example, a porous layer and a contiguous denser layer, can have advantageous properties including enhanced oxygen selectivity.

Thin film coatings of oxygen transport membranes, such as the perovskites, are particularly desirable because the ideal oxygen flux is inversely proportional to the thickness of the membrane. On this basis, a thin film is preferred since it permits higher oxygen fluxes and reduced surface area, as compared to thicker films, thus resulting in lower membrane operating temperatures and smaller oxygen pressure differentials across the electrolyte during operation of the membrane.

Heretofore, several techniques have been described for fabricating dense OTM coatings, including chemical vapor deposition, electrostatic spray depositions, electrochemical vapor deposition, sputtering, spray pyrolysis, sol-gel thin film processing, and laser ablation. By way of illustration, a technical journal article by Y. Teraoka et al entitled "Preparation of Dense Film of Perovskite-Type Oxide on Porous Substrate", appearing in Nippon Seramkkusu Kyokai Gakiyutsu Ronbunshi (Japanese Version) Volume 97, Nov. 5, 1989 compared sputtering with suspension spray deposition, and concluded that the sputtering process produced a lot of cracks, resulting in a failure to form dense films, whereas improved dense films were formed using the suspension spray deposition technique.

As another illustration, U.S. Pat. No. 5,439,706 to Richards et al discloses a method for manufacturing OTMs using organometallic chemical vapor deposition. Nonetheless, although chemical vapor deposition processes are suitably employed to produce dense, gas-tight ceramic thin films, these processes have the disadvantages of being time consuming, requiring expensive processing equipment, and typically employing toxic precursor chemicals. Further, stoichiometry control for purposes of the formation of the oxide film is difficult to maintain using these processes. The physical deposition processes, such as sputtering and laser ablation, also have distinct disadvantages, since they are typically complex processes, often requiring vacuum systems, and typically employing low deposition rates that don't lend themselves to use for commercial production of OTMs.

Yet another alternative is thermal spraying. Thermal spraying involves spraying a molten powder of metal or metal oxide onto the surface of a substrate using a plasma or thermal spray gun. In short, it is a heat and momentum-related process involving energy transfer that is attributable to enthalpy and velocity, and the resulting spray coating on a substrate provides strong mechanical bonding of the coating to the substrate without undesirable overheating in view of very short processing times. Thermal spraying processes include plasma spraying and high velocity oxygen fuel ("HVOF") spraying.

Heretofore, plasma spraying has been disclosed for use in fabricating dense lanthanum chromite interconnectors for solid oxide fuel cell applications. Unfortunately, the resulting coating typically is porous and contains significant numbers of microcracks, necessitating a subsequent heat-treating step at temperatures of from 1450 to 1550 degrees Centigrade in order to provide the desired dense, microcrack-free coating. Illustrative of the use of plasma deposition in the preparation of electrically conductive interconnection layers on an electrode structure of an electrochemical cell are the disclosures provided in U.S. Pat. No. 5,391,440 to Kuo et al., incorporated herein by reference in its entirety. There are several disadvantages associated with the invention disclosed in Kuo et al., namely (1) the subsonic plasma spraying step provides a coating on the electrode substrate that contains unwanted microcracks, (2) the plasma spray requires the use of a "flux" or "liquid phase former" that risks introducing unwanted elements into the coating, and (3) a post-spraying heat-treating step is required to "heal" the resulting microcracks.

Heretofore there has been no disclosure of the use of plasma deposition methodology of any kind, much less supersonic plasma deposition, in the preparation of dense, microcrack-free coatings, for use as oxygen transport membranes, without a post plasma spraying heat treating step, to the knowledge of the present inventors. In addition, there has been no disclosure of the use of supersonic plasma deposition to provide microcrack-free thermal barrier or interconnector coatings. Further, there has been no disclosure of the use of subsonic plasma spraying of nanocrystalline particles to produce such microcrack-free coatings.

Fast, cost-effective methods are needed for fabricating dense, thin-film, gas-tight oxygen or hydrogen transport membrane coatings, that are free of microcracks, on dense or porous substrates. The present invention provides one such method for fabricating these OTMs and HTMs using supersonic, sonic or subsonic speed plasma spraying to provide the desired coating.

SUMMARY OF THE INVENTION

In one aspect, the present invention relates to a method for fabricating an oxygen or hydrogen transport membrane comprising spraying a single phase ionic, electronic or mixed-conducting or dual phase mixed conducting composition (advantageously comprising particles of ceramic, or metal, or a combination thereof) in plasma form, in the presence of an inert gas as a plasma medium, at a supersonic speed from a plasma torch, and depositing said composition onto a porous or dense substrate in order to provide the oxygen or hydrogen transport membrane in the form of a microcrack-free ceramic coating on the substrate.

In another aspect, the present invention relates to a method of fabricating an oxygen or hydrogen transport membrane comprising spraying particles of a single or dual phase composition comprising particles of ceramic or metal, or a combination thereof, in plasma form, in the presence of an inert gas as a plasma medium, at sonic or subsonic speed from a plasma torch, with the proviso that said particles are agglomerates of nanocrystalline size if the plasma is employed at subsonic speed, and depositing said composition onto a porous or dense substrate in order to provide the oxygen or hydrogen transport membrane comprising a porous or dense ceramic coating on the substrate.

In still another aspect, the present invention relates to a method of forming a dense OTM or HTM coating on a substrate which comprises providing a single or dual phase ceramic-forming feed powder in admixture with an inert gas plasma spray medium, and thermal spraying the feed powder in the plasma spray medium onto a porous or dense substrate in order to form the dense OTM or HTM coating on the substrate.

In yet another aspect, the present invention relates to a microcrack-free oxygen or hydrogen transport membrane produced by a method comprising spraying, at a supersonic speed, particles of a single or dual phase composition comprising particles of ceramic, metal, or a combination thereof, in plasma form, in a flux-free plasma medium of an inert gas, and depositing said composition onto a porous or dense substrate in order to provide the oxygen or hydrogen transport membrane in the form of a microcrack-free coating on the substrate.

In yet another aspect, the present invention relates to a microcrack-free oxygen transport membrane produced by a method comprising spraying single or dual phase powder particles of ceramic, or metal, or a combination thereof, in a plasma medium comprising an inert gas by high velocity oxygen fuel thermal spray at a supersonic speed, and depositing the particles onto a porous or dense substrate in order to provide the oxygen transport membrane in the form of a microcrack-free ceramic coating on the substrate.

In still another aspect, the present invention relates to a multi-layer composite comprising a dense or porous substrate and a microcrack-free coating on the substrate, said coating being prepared by spraying particles of a single or dual phase composition comprising particles of ceramic, or metal, or a combination thereof, in plasma form, in the presence of an inert gas as a plasma medium, at sonic or subsonic speed from a plasma torch, with the proviso that said particles are of nanocrystalline size if the plasma is employed at subsonic speed, and depositing said composition onto a porous or dense substrate in order to provide the multi-layer composite.

In yet another aspect, the present invention relates to a single phase ionic conductor, suitable for use in solid oxide fuel cell or electrically-driven oxygen generator applications, fabricated by spraying single phase powder particles of ceramic, or metal, or a combination thereof, in a plasma medium comprising an inert gas, at supersonic speed, and depositing the particles onto a porous or dense substrate in order to provide the single phase ionic conductor in the form of a microcrack-free ceramic coating on the substrate.

In still another aspect, the present invention relates to a single phase electronic conducting oxide, useful for interconnector applications, fabricated by spraying single phase powder particles of ceramic, in a plasma medium comprising an inert gas, at supersonic speed, and depositing the particles onto a porous or dense substrate in order to provide the single phase electronic conductor in the form of a microcrack-free ceramic or metal coating on the substrate.

These and other aspects will become apparent upon reading the following description of the invention.

DETAILED DESCRIPTION OF INVENTION

Figure 1:
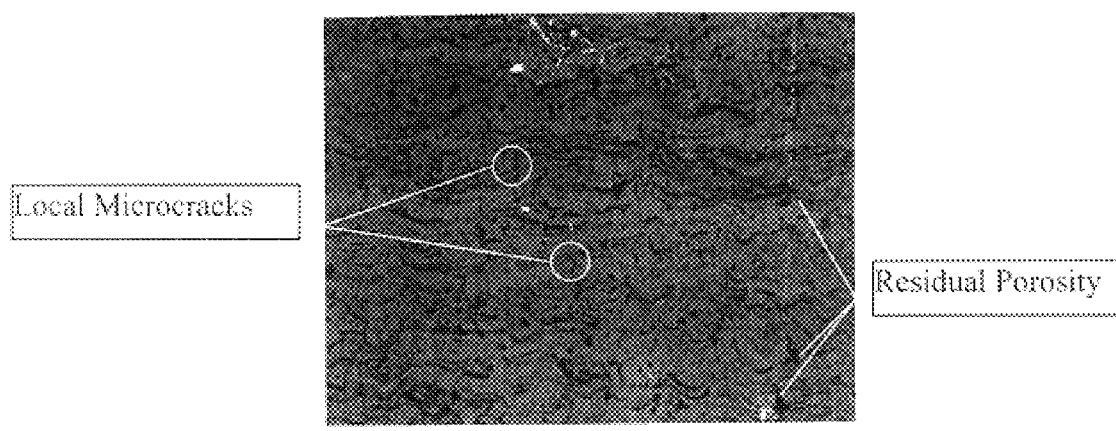
FIG. 1 is a cross-sectional photomicrograph representation at 500×magnification of a LSFCM coating deposited on a stainless steel substrate by subsonic plasma spraying in accordance with Example 1. This photomicrograph representation depicts a 250 microns thick, dense, uniform coating having localized residual porosity and localized microcracks.

It has now been surprisingly found by the present inventors that supersonic plasma spraying, using spray modes in the Mach I to Mach II range, are suitably employed to fabricate OTMs and HTMs comprising a uniform, dense, essentially microcrack-free coating of a ceramic, or metal, or combination thereof, composition on a porous or dense substrate. The method of the present invention is particularly useful in the rapid, cost-effective fabrication of OTMs and HTMs based upon thin plasma sprayed coatings. These thin coatings afford particular advantage during use of the OTM since it is axiomatic that the ideal oxygen flux is inversely proportional to the thickness of the membrane. Thus, OTMs produced using plasma spray fabrication in accordance with the present invention will provide advantages in both production and use. During use, the thin coatings made in accordance with the present invention enable operation of the OTM using higher oxygen fluxes, reduced membrane areas, lower membrane operating temperatures, and smaller oxygen partial pressure differentials across the electrolyte, as compared to conventionally produced OTMs.

Ceramic coatings useful in the present invention are suitably formed from an inorganic oxide, typified by calcium- or yttrium-stabilized zirconia or analogous oxides having a fluorite or perovskite structure. The OTM, fabricated by plasma deposition of a ceramic coating onto a suitable substrate, advantageously have a nominal coating thickness of under 500 microns, preferably less than 300 microns thick, more preferably less than 100 microns thick. The OTM is useful for transporting oxygen ions and electrons at the prevailing oxygen partial pressure in the temperature range of from 450° C. to about 1200° C. when an oxygen chemical potential difference is maintained across the ion transport membrane surface caused by maintaining a positive ratio of oxygen partial pressures across the ion transport membrane. OTM's oxygen ion conductivity is typically in the range of between 0.01 and 100 S/cm where S is reciprocal ohms (1/ohms).

Suitable ceramic materials for fabricating OTMs in accordance with the present invention include perovskites and dual phase metal/metal oxide combinations as listed in Table 1. Illustrative perovskites include $La_{1-x}Sr_xCoO_{3-y}$, $La_xSr_{1-x}FeO_{3-y}$, and $La_xSr_{1-x}Fe_{1-y}Co_yO_{3-z}$. Since the reactive environment on the anode side of the oxygen-selective ion transport membrane, in many applications, creates very low partial oxygen pressures, the chromium-containing perovskites listed in Table 1 may be preferred materials since these tend to be stable in the low partial oxygen pressure environment. The chromium-containing perovskites are not typically decomposed at very low oxygen partial pressures.

In fabricating OTMs in accordance with the method of the present invention, the plasma sprayed coating can be composed of the same composition as the underlying substrate, or it can be fabricated from a different material. By way of example, an OTM is suitably prepared by plasma spraying a dense perovskite coating onto a porous perovskite substrate that is compositionally identical to that of the coating. Alternatively, the coating and the substrate can be compositionally different, as illustrated by the various substrate/coating combinations described in the working examples hereinbelow. In any event, the plasma sprayed coating enhances the oxygen surface exchange of the OTM. Compositionally, the ceramic powder used in the plasma spray method of this invention can be employed to provide a compositionally-identical single-phase ceramic coating, as illustrated by Example 3 presented hereinbelow.

TABLE I

Mixed Conducting Solid Electrolytes

Material Composition

1. $(La_{1-x}Sr_x)(Co_{1-y}Fe_y))_{3-\delta}(0 \leq x \leq 1, 0 < 0 y < 1,$
   $\delta$ from stoichiometry)
2. $SrMnO_{3-\delta}(\delta$ from stoichiometry)
   $SrMn_{1-y}Co_yO_{3-\delta}(0 \leq y \leq 1, \delta$ from stoichiometry)
   $Sr_{1-x}Na_xMnO_{3-\delta}(0 < x < 1, \delta$ from stoichiometry)
3. $BaFe_{0.5}CO_{0.5}YO_3$
   $SrCeO_3$
   $YBa_2Cu_3O_{7-\delta}(0 \leq \delta \leq 1, \delta$ from stoichiometry)
4. $La_{0.2}Ba_{0.8}CO_{0.8}Fe_{0.2}O_{2.6}; Pr_{0.2}Ba_{0.8}Fe_{0.2}O_{2.6}$
5. $A_xA'_{x'}A"_{x"}B_yB'_{y'}B"_{y"}O_{3-\delta}$
   (x, x', x", y, y', y" all in 0–1 range)
   Where: A, A', A" = from groups 1, 2, 3 and f-block lanthanides
   B, B', B" = from d-block transition metals
   $\delta$ from stoichiometry
6. (a) Co-La-Bi type:   Cobalt oxide       15–75 mole %
                        Lanthanum oxide    13–45 mole %
                        Bismuth oxide      17–50 mole %
   (b) Co-Sr-Ce type:   Cobalt oxide       15–40 mole %
                        Strontium oxide    40–55 mole %
                        Cerium oxide       15–40 mole %
   (c) Co-Sr-Bi type    Cobalt oxide       10–40 mole %
                        Strontium oxide     5–50 mole %
                        Bismuth oxide      35–70 mole %
   (d) Co-La-Ce type:   Cobalt oxide       10–40 mole %
                        Lanthanum oxide    10–40 mole %
                        Cerium oxide       30–70 mole %
   (e) Co-La-Sr-Bi type: Cobalt oxide      15–70 mole %
                        Lanthanum oxide     1–40 mole %
                        Strontium oxide     1–40 mole %
                        Bismuth oxide      25–50 mole %
   (f) Co-La-Sr-Ce type: Cobalt oxide      10–40 mole %
                        Lanthanum oxide     1–35 mole %
                        Strontium oxide     1–35 mole %
                        Cerium oxide       30–70 mole %
7. $Bi_{2-x-y}M'_xM_yO_{3-\delta}(0 \leq x \leq 1, 0 \leq y \leq 1,$
   $\delta$ from stoichiometry)
   Where: M' = Er, Y, Tm, Yb, Tb, Lu, Nd, Sm, Dy, Sr, Hf, Th, Ta, Nb, Pb
   Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB"_wO_x$ family whose
   composition is disclosed in U.S. Pat. No. 5,306,411
   (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   And s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B',
   B" in the formula; and $0.9 < (s + t)/(u + v + w) < 1.1$
10. One of the materials of $La_{1-x}Sr_xCu_{1-y}M_yO_{3-\square}$ family, where:
    M represents Fe or Co;
    x equals from zero to about 1;
    y equals from zero to about 1;
    $\delta$ equals a number that satisfies the valences of La, Sr, Cu, and M in the formula
11. One of the materials of $Ce_{1-x}A_xO_{2-\delta}$ family, where;
    A represents a lanthanide, Ru or Y, or a mixtyre thereof;
    x equals from zero to about 1;
    $\delta$ equals a number that satisfies the valences of Ce and A in the formula
12. One of the materials of $Sr_{1-x}Bi_xFeO_{3-\delta}$ family, where:
    A represents a lanthanide, or Y, or a mixture thereof;
    x equals from zero to about 1;

TABLE I-continued

Mixed Conducting Solid Electrolytes

Material Composition $\delta$ equals a number that satisfies the valences of Ce and A in the formula
13. One of the materials of $Sr_xFe_yCo_zO_{3-\delta}$ family, where:
    x equals from zero to about 1;
    y equals from zero to about 1;
    $\delta$ equals a number that satisfies the valences of Sr, Bi and Fe in the formula
14. Dual phase mixed conductors (electronic/ionic):
    $(Pd)_{0.5}/(YSZ)_{0.5}$
    $(Pt)_{0.5}/(YSZ)_{0.5}$
    $(LaCr_{1-y}MgO_{3-\delta})_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g, Pd, Pt, Ag, Au, Ti, Ta, W) is added
15. One of the materials of $A_{2-x}A'_xB_{2-y}B'_yO_{5+z}$ family whose composition is disclosed in WO 97/41060 (Schwartz et al.) as follows:
    A represents an alkaline earth metal or a mixture thereof;
    A' represents a lanthanide or Y, or a mixture thereof;
    B represents a metal ion or mixtures of 3d transition metal ions and group 13 metals;
    B' represents a metal ion or mixtures of 3d transition metal ions and group 13 metals, the lanthanides and yttrium;
    $0 < x < 2; 0 < y < 2;$ z renders the compound charge neutral
16. One of the materials of $Ln_xA'_xCo_yFe_{y'}Cu_{y"}O_{3-z}$ family whose composition is disclosed in EP 0 732 305 A1 (Dyer et al.) as follows:
    Ln represents a f block lanthanide;
    A' represents Sr or Ca;
    $x > 0, y > 0, x + x' = 1, y + y' + y" = 1, 0 < y \leq 0.4$
    z renders the compound charge neutral
17. One of the materials of $Ln_xA'_{x'}A"_{x"}B_yB'_{y'}B"_{y"}O_{3-z}$
    $O_{3-z}$ family whose composition is disclosed in EP 0 931 763 A1 (Dyer et al.) as follows:
    Ln represents a f block lanthanide;
    A' from groups 2;
    A" from groups 1, 2, 3 and f-block lanthanides
    B, B' from d-block transition metals excluding Ti and Cr
    $0 \leq x < 1, 0 < x' \leq 1, 0 < y < 1.1, 0 \leq y' < 1.1,$
    $x + x' + x" = 1.0, 1.1 > y + y' > 1.0,$
    z renders the compound charge neutral Other solid electrolyte materials, besides those listed in Table I above, are within the scope of the present invention, such as zirconia, ceria, bismuth oxides, and lanthanum gallate. Likewise, interconnector materials, including lanthanum chromite, lanthanum maganite, are suitably employed for fabricating solid oxide fuel cell and electrically-driven oxygen generator applications.

Clearly, the present invention has wide application to a wide variety of industrial uses. Illustratively, the following specific applications are envisioned for the coatings made in accordance with the present invention: (1) single phase mixed conducting oxides (e.g. perovskites) for oxygen or hydrogen transport membrane applications, (2) single phase ionic conductor solid electrolyte (e.g., fluorites) for solid oxide fuel cell and electrically driven oxygen generator applications, (3) dual phase mixed conductors with a ceramic second phase, (4) dual phase mixed conductors with a metallic second phase, and (5) single phase electronic conducting oxides (e.g., perovskites) for use in solid oxide fuel cell or as an interconnection layer on an electrode structure of an electrochemical cell.

The method of the present invention preferably employs plasma spray methodology, but alternatively can use high velocity oxygen fuel (HVOF) thermal spray. As an illustration of the plasma spray use, the fabrication of a dense, gas tight ceramic OTM or HTM coating is suitably effected by plasma spray deposition onto a porous substrate using the method of this invention. The plasma spraying is suitably carried out using fine agglomerated sizes of ceramic powder, typically having an average agglomerated particle size of less than 40 $\mu$m, preferably less than 30 $\mu$m, most preferably in the range of 15–25 $\mu$m. As another illustration, a porous $La_{0.2}Sr_{0.8}Fe_{0.79}Cr_{0.2}Mg_{0.01}O_3$ (LSFCM) coating deposited on a porous LSFCM-m substrate, as described in more detail in Example 8 hereinbelow. Individual particles useful in preparing the agglomerates typically range in size from nanocrystalline size to an upper limit of about 5 microns in size, and the nanocrystalline size is employed when plasma spray at subsonic speeds is used. The particle size within the agglomerate can be less than 1000 nm and also less than 200 nm. The plasma medium can be argon, helium or a combination thereof.

In fabricating porous coatings using the method of the present invention, a wide range of pore sizes and porosities are obtainable. Thus, although a porosity of more than 30% with a pore size of up to 10 micron was obtained for the LSFCM coating described in Example 8, the spray conditions and the pore former are suitably modified to provide a porosity greater than 50% and a pore size of greater than 50 $\mu$m for the porous coating.

Examples 1–8 described hereinbelow describe in more detail the particulars of the plasma medium (i.e., an inert gas), plasma torch (or plasma gun or arc) and power used, the powder utilized with the plasma medium, and the plasma torch manipulation employed in the examples. Briefly, the powder particles are admixed with the plasma medium. The plasma medium-added particle spray powder mixture or plasma spray feed powder is preferably agglomerated prior to thermal spraying by well-known agglomeration techniques to provide a free-flowing plasma spray feed powder. The plasma medium-added spray ceramic metal and/or metal oxide particle mixture is thus preferably agglomerated in order to facilitate entrainment in a plasma plume generated by a plasma torch or spray gun utilized. As another alternative, plasma arc spraying can be used in the method of the present invention. Preferably, the plasma spray feed powder has a uniform agglomerated particle size distribution with an average particle size in the range of 5 to 80 microns, more preferably 10 to 25 microns.

The following examples are intended to illustrate, but in no way limit the scope of, the present invention.

EXAMPLES

Example 1 (Comparative Example)

Deposition of $La_{0.2}Sr_{0.8}Fe_{0.79}Cr_{0.2}Mg_{0.01}O_3$ (LSFCM) Coating by Subsonic Plasma Spraying The LSFCM coating was prepared by subsonic-mode plasma spraying on a stainless steel substrate. The sprayed-dried LSFCM powder was fed into the plasma spray gun vertically via Ar carrier gas through a Praxair powder feeder. A subsonic mode of plasma spraying was set up as follows:
Plasma Medium:
  40 slm Ar with 21 slm He, where slm is standard liters per minutes.
Plasma Torch and Power:
  Subsonic mode of Praxair SG-100 plasma torch with a power of 900 amps, 29 volts and 26 Kilowatts.
Powder and Feed:
  LSFCM powder (20 $\mu$m agglomerates) is prepared by Praxair Specialty Ceramics, Inc. Powder was fed at 10 mm upstream from the torch exit with 4 slm Ar carrier gas at 30 psi and with a 3.0 rpm setting of Praxair powder feeder (equals approximately to 18 grams/minute feed rate).
Torch Manipulation:
  40 passes at a scan of 500 mm/second in a 3 mm step ladder pattern horizontal to the substrate and at a distance of 75 mm from the substrate. The ladder pattern is repeated composed of left to right and right to left torch movements with a 3 mm step between the lines of opposite movement.

FIG. 1 shows a cross-sectional photomicrograph of a LSFCM film deposited on a stainless steel substrate by conventional subsonic plasma spraying. The as-deposited LSFCM coating was about 250 microns in thickness. Although no major cracks were observed, FIG. 1 reveals residual porosity and micro-cracks in the coating throughout the cross-section.

Example 2

Deposition of LSFCM Coating by Mach I Plasma Spraying

LSFCM coating was deposited on a stainless steel substrate using a Mach I-mode supersonic plasma spraying. The sprayed powder was fed into the torch in the same way as described in the example 1. A Mach I mode of plasma spraying was set up as follows:
Plasma Medium:
  40 slm Ar with 21 slm He.
Plasma Torch and Power:
  Mach I mode of Praxair SG-100 plasma torch with a power of 900 amps, 34 volts and 30 Kilowatts.
Powder and Feed:
  LSFCM powder (20 $\mu$m agglomerates) is prepared by Praxair Specialty Ceramics, Inc. Powder was fed at 10 mm upstream from the torch exit with 5.5 slm Ar carrier gas at 40 psi and with a 3.0 rpm setting of Praxair powder feeder (equals approximately to 18 grams/minute feed rate).
Torch Manipulation:
  40 passes at a scan of 500 mm/second in a 3 mm step ladder pattern horizontal to the substrate and at a distance of 90 mm from the substrate.

Figure 2:
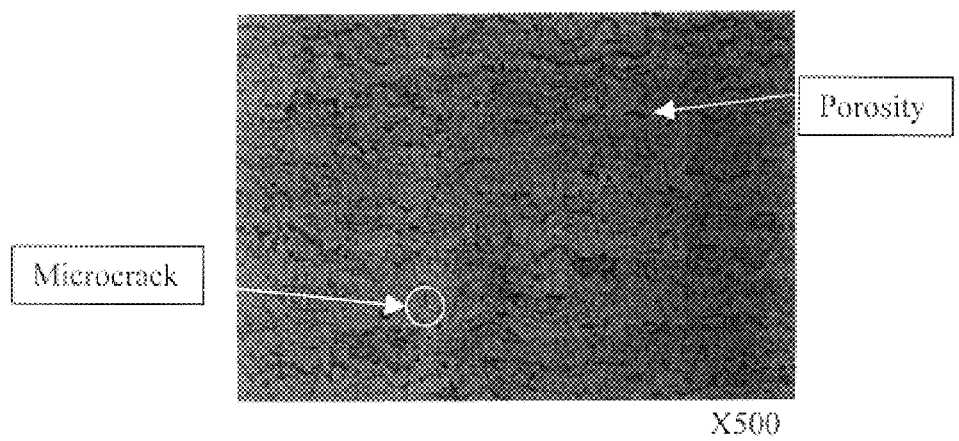
FIG. 2 is a cross-sectional photomicrograph representation at 500×magnification of a LSFCM coating deposited on a stainless steel substrate in accordance with Example 2. This photomicrograph representation depicts a 350 microns thick, dense, uniform coating having reduced porosity and a minimal number of microcracks, as compared to the coating of Example 1.

FIG. 2 shows a cross-sectional photomicrograph of a LSFCM film deposited on a stainless steel substrate by Mach I-mode plasma spraying. The LSFCM coating formed was about 350 microns in thickness. The coating density was improved by the increase of the velocity of plasma, with minimal microcracks and low residual porosity observed in the cross-section.

Example 3

Deposition of LSFCM Coating by Mach II Plasma Spraying

LSFCM coating was deposited on a stainless steel substrate using a Mach II-mode supersonic plasma spraying. The sprayed powder was fed into the torch in the same way as described in the example 1. A Mach II mode of plasma spraying was set up as follows:
Plasma Medium:
  105 slm Ar with 40 slm He.
Plasma Torch and Power:
  Mach II mode of Praxair SG-100 plasma torch with a power of 950 amps, 73 volts and 69 Kilowatts.
Powder and Feed:
  20 micron agglomerate LSFCM powder from Praxair Specialty Inc.

Feed at 10 mm upstream from the torch exit with 10 slm Ar carrier gas at 100 psi and with a 3.0 rpm setting of Praxair powder feeder (equals approximately to 18 grams/minute feed rate).

Torch Manipulation:

40 passes for steel substrate and 6 passes for porous MgO substrate both at a scan of 500 mm/second in a 3 mm step ladder pattern horizontal to the substrate and at a distance of 90 mm from the substrate.

Figure 3A:
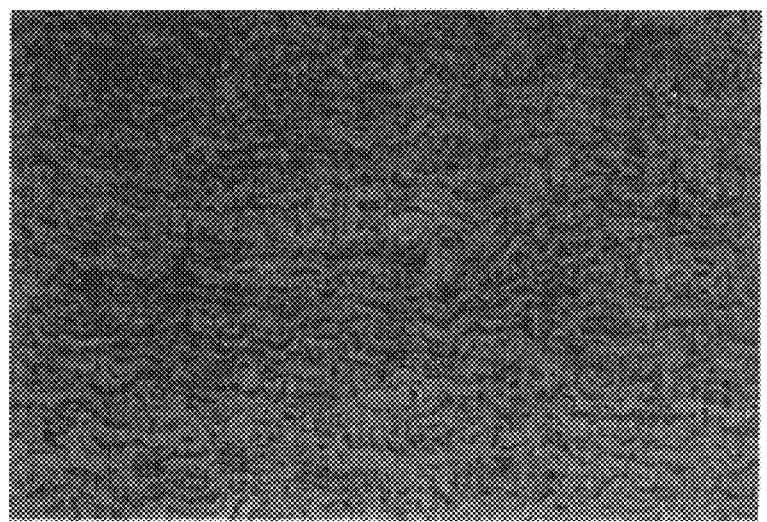
FIG. 3a is a cross-sectional photomicrograph representation at 500×magnification of a LSFCM coating deposited by a Mach II plasma spraying on a stainless steel oxide substrate in accordance with Example 3. This photomicrograph representation depicts an approximately 240 microns thick, highly dense, and crack-free uniform coating as compared to the coating of Example 1.
Figure 3B:
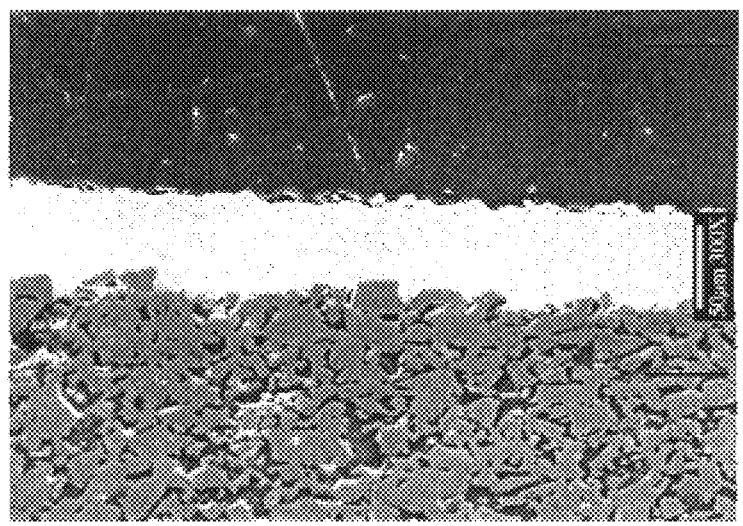
FIG. 3b is a cross-sectional scanning electron microscopy. ("SEM") representation of a LSFCM coating deposited by a Mach II plasma spraying on a porous magnesium oxide substrate in accordance with Example 3. This SEM representation depicts an approximately 50 microns thick, highly dense, uniform and crack-free LSFCM coating as compared to the coating of Example 1.

FIG. 3a shows a cross-sectional photomicrograph of 240 μm LSFCM film prepared on a stainless steel substrate. The image was taken under the same magnification as shown in FIGS. 1 and 2. As compared to the films prepared by subsonic mode (FIG. 1) and Mach I (FIG. 2), the LSFCM film by Mach II is ultra-highly dense and crack-free. FIG. 3b shows a cross-sectional SEM of the LSFCM film fabricated by Mach II on a porous magnesium oxide (MgO) substrate. As shown in FIG. 3b, the dense LSFCM film of ~50 microns (middle, brighter) was between the porous MgO substrate (lower, gray) and epoxy (upper, dark). The epoxy was used for mounting the sample. FIG. 3b indicates that the ultra-highly dense LSFCM film was able to deposit on the porous MgO substrate (~34% porosity).

Figure 4:
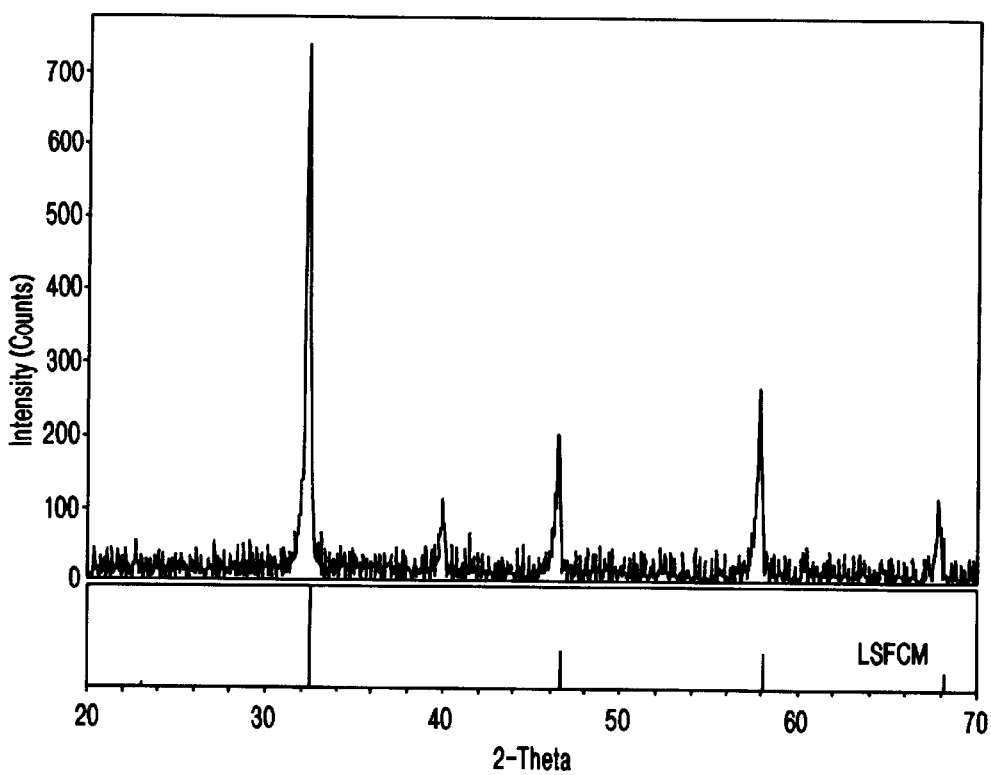
FIG. 4 is an x-ray diffraction ("XRD") representation of the LSFCM coating of Example 3 showing that the coating is in the form of a single phase perovskite.
Figure 5:
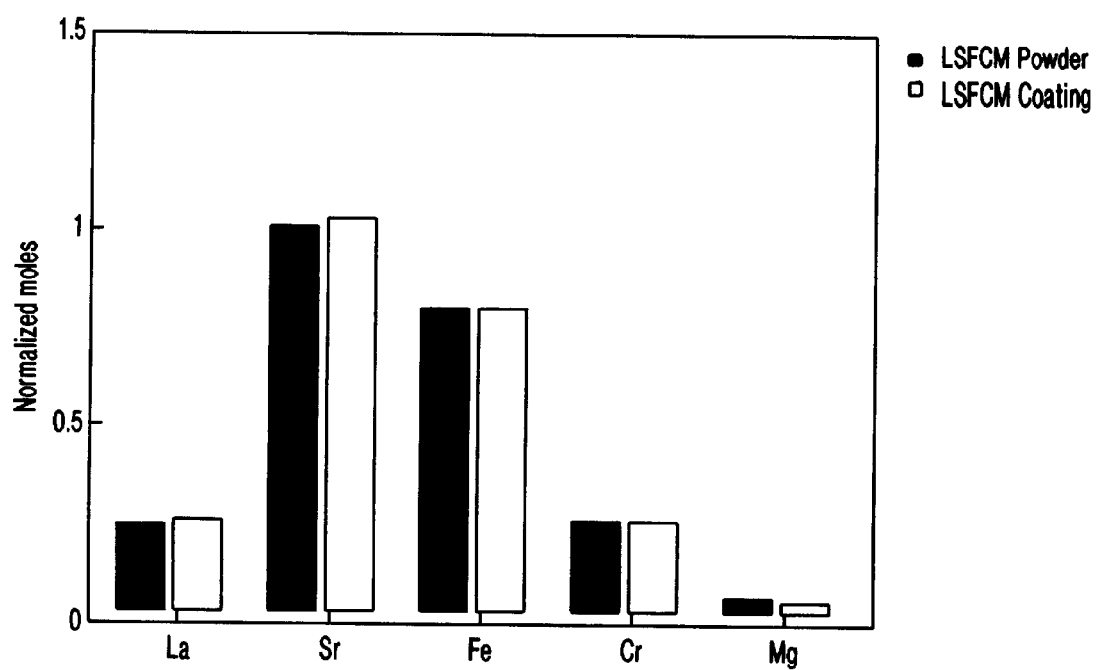
FIG. 5 is a graphical representation of a compositional comparison between the LSFCM coating of Example 3 with comparison LSFCM powder demonstrating that the coating and the powder are compositionally identical.

It should be pointed out that the as-sprayed LSFCM film by Mach II-mode plasma spraying looks not only dense and crack-free but also uniform with a good bonding between the film and the substrate. XRD shows the as-sprayed film is a single-phase perovskite structure (FIG. 4), which is ideal of the film as an OTM. ICP analysis (FIG. 5) also shows that the as-sprayed LSFCM film reveals substantially the same composition as compared to that of the feed powder.

Example 4

Deposition of $La_{0.05}Sr_{0.95}CoO_3$ (LSC) Coating by Mach II Plasma Spraying LSC coating was deposited on a porous LSC-m (LSC+20 wt. % Pd/Ag) using a Mach II-mode supersonic plasma spraying. The sprayed powder was fed into the torch in the same way as described in the example 1. A Mach II mode of plasma spraying was set up as follows:

Plasma Medium:

105 slm Ar with 40 slm He.

Plasma Torch and Power:

Mach II mode of Praxair SG-100 plasma torch with a power of 950 amps, 73 volts and 69 Kilowatts.

Powder and Feed:

15 micron LSC powder from Praxair Specialty Inc.

Feed at 10 mm upstream from the torch exit with 10 slm Ar carrier gas at 100 psi and with a 3.0 rpm setting of Praxair powder feeder (equals approximately to 18 grams/minute feed rate).

Torch Manipulation:

Eight passes at a scan of 500 mm/second in a 3 mm step ladder pattern horizontal to the substrate and at a distance of 90 mm from the substrate.

Figure 6:
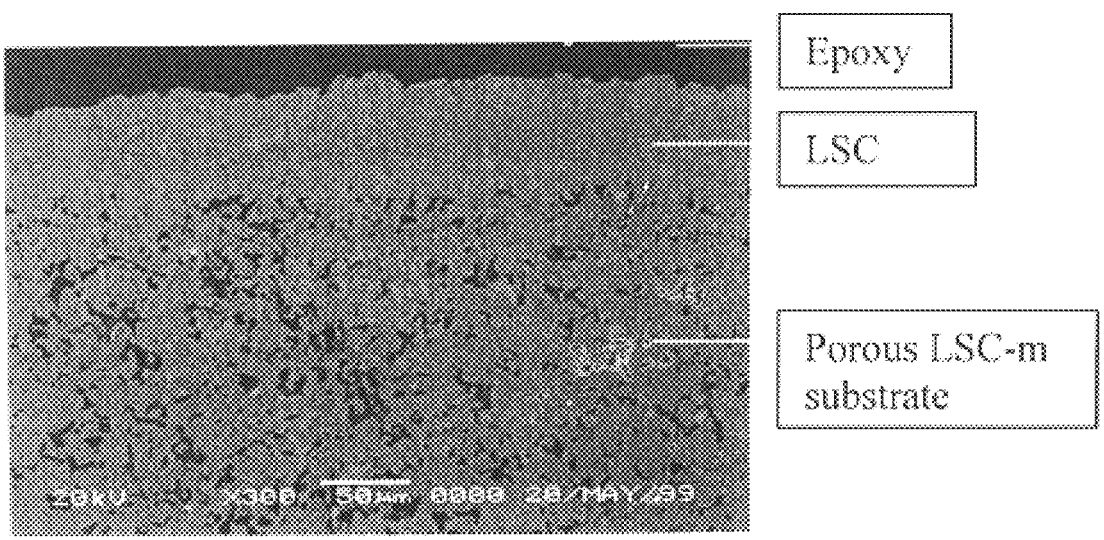
FIG. 6 is a cross-sectional scanning electron microscopy ("SEM") representation of a LSFCM coating deposited by a Mach II plasma spraying on a porous LSCM substrate in accordance with Example 4. This SEM representation depicts an approximately 50 microns thick, dense, crack-free, uniform LSFCM coating.
Figure 7A:
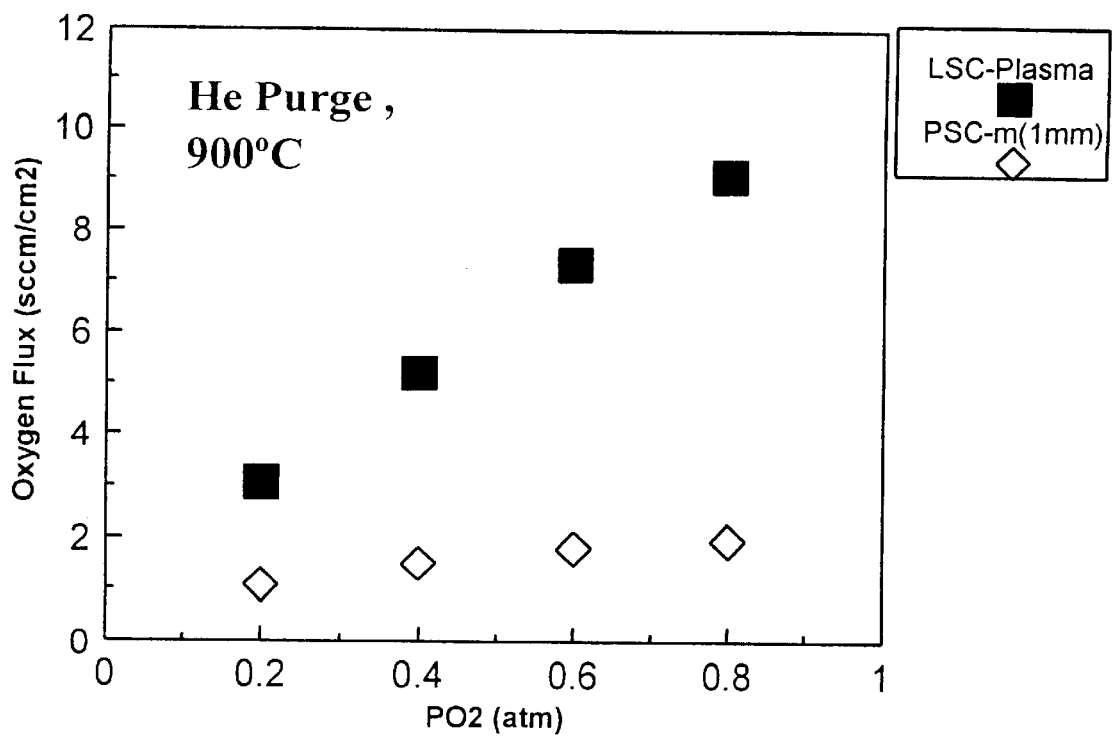
FIG. 7 is a graphical representation of the product of Example 5 showing flux performance and the stability of a Mach II plasma spraying LSC composite disc at 900 degrees Centigrade using air as a feed gas.
Figure 7B:
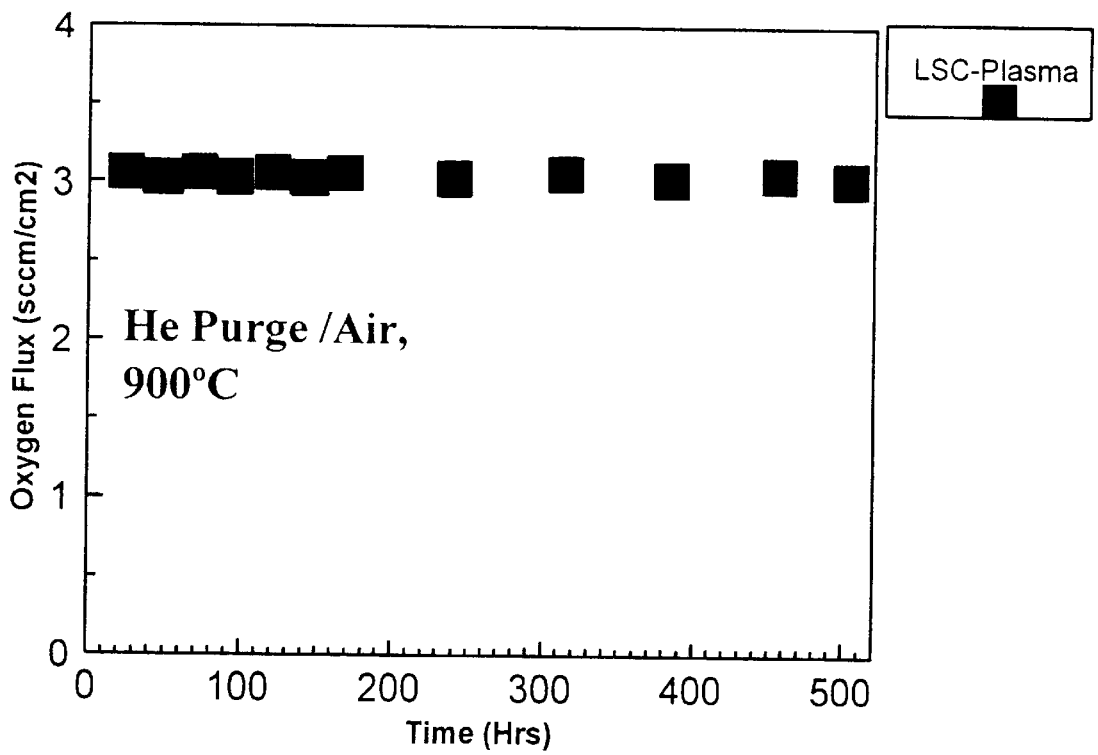

FIG. 6 shows a cross-sectional SEM of the LSC film deposited on a porous LSC-m substrate. The LSC film was dense and crack-free with a thickness of about 50 microns. The high temperature permeation tests of LSC/LSC-m composite disc was performed at 900° C. using different $N_2/O_2$ mixtures as feed gases and He as a purge gas. An $O_2$ flux of 9 sccm/cm$^2$ was obtained at 900° C. for a 50 μm LSC film on a porous LSC-m substrate (1.7 mm) using a $80\%O_2/N_2$ feed gas. FIG. 7 shows flux performance and the stability of plasma sprayed LSC composite disc at 900° C. using air as a feed gas. After being tested for 500 hrs., the plasma-sprayed coating remained intact and good bonding with the substrate.

Example 5

Deposition of Dual Phase Mixed Conductors With Ceramic 2nd Phase by Supersonic Plasma Spraying-LSFCM with 50 wt. % $Ce_{0.8}Gd_{0.2}O_2$ (LSFCM-50CGO)

The LSFCM-50CGO coating was deposited on a porous LSFCM-50CGO substrate using a Mach II-mode supersonic plasma spraying. The sprayed powder was fed into the torch in the same way as described in the example 1. A Mach II mode of supersonic plasma spraying was set up as follows:

Plasma Medium:

95 slm Ar with 45 slm He.

Plasma Torch and Power:

Mach II mode of Praxair SG-100 plasma torch with a power of 900 amps, 58 volts and 52 Kilowatts.

Powder and Feed:

20 micron agglomerate powder of LSFCM mixed with 50 wt. % of CGO from Praxair Specialty Inc. Feed at 10 mm upstream from the torch exit with 10 slm Ar carrier gas at 100 psi and with a 3.0 rpm setting of Praxair powder feeder (equals approximately to 18 grams/minute feed rate).

Torch Manipulation:

Eight passes at a scan of 500 mm/second in a 3 mm step ladder pattern horizontal to the substrate and at a distance of 90 mm from the substrate.

Figure 8:
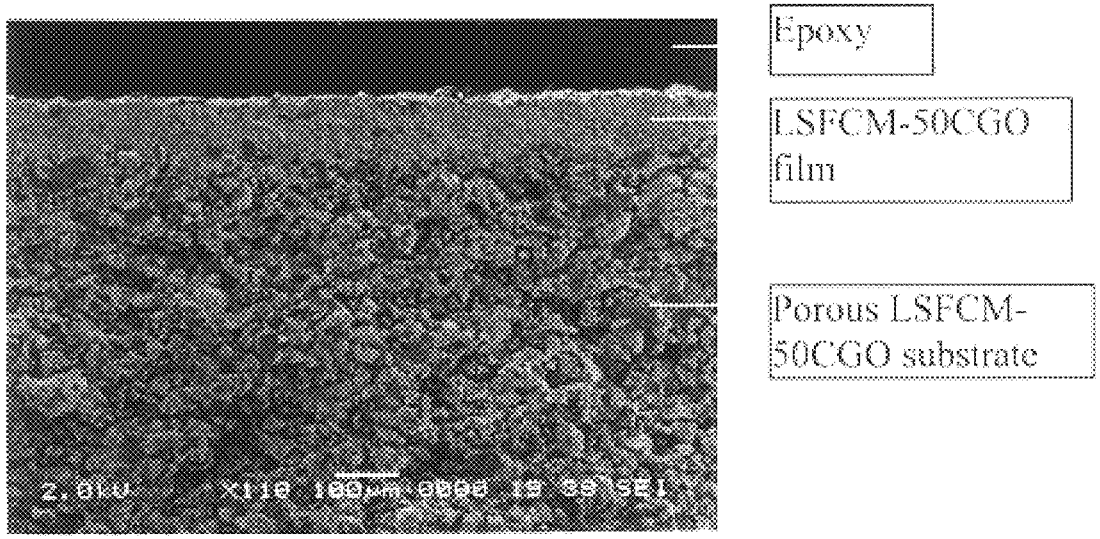
FIG. 8 is a cross-sectional scanning electron microscopy ("SEM") representation of a LSFCM-50CGO coating deposited by Mach II plasma spraying on a porous LSFCM-50CGO substrate in accordance with Example 5. This SEM representation depicts an approximately 100 microns thick, dense, crack-free, uniform LSFCM-50CGO coating having both LSFCM and CGO deposits uniformly distributed throughout the coating.

FIG. 8 shows a cross-sectional SEM of the LSFCM-50CGO film deposited on a porous LSFCM-50CGO substrate. The LSFCM-50CGO film was dense and crack-free with a thickness of about 100 microns. Higher SEM observations reveal that both LSFCM and CGO deposits are uniformly distributed in the coating. The film was also well bonded with the porous substrate, as shown in FIG. 8.

Example 6

Deposition of Dual Phase Mixed Conductors With Metallic 2nd Phase by Supersonic Plasma Spraying-$Ce_{0.8}Gd_{0.2}O_2$ with 40 wt. % of Pd (CGO-Pd)

The CGO-Pd coating was deposited on a porous LSFCM-50CGO substrate using a Mach II-mode supersonic plasma spraying. The sprayed powder was fed into the torch in the same way as described in the example 1. A Mach II mode of plasma spraying was set up as follows:

Plasma Medium:

95 slm Ar with 45 slm He.

Plasma Torch and Power:

Mach II mode of Praxair SG-100 plasma torch with a power of 900 amps, 58 volts and 52 Kilowatts.

Powder and Feed:

20 micron agglomerate powder of CGO mixed with 40 wt% of Pd from Praxair Specialty Inc. Feed at 10 mm upstream from the torch exit with 10 slm Ar carrier gas at 100 psi and with a 3.0 rpm setting of Praxair powder feeder (equals approximately to 18 grams/minute feed rate).

Torch Manipulation:

Twelve passes at a scan of 500 mm/second in a 3 mm step ladder pattern horizontal to the substrate and at a distance of 90 mm from the substrate.

Figure 9:
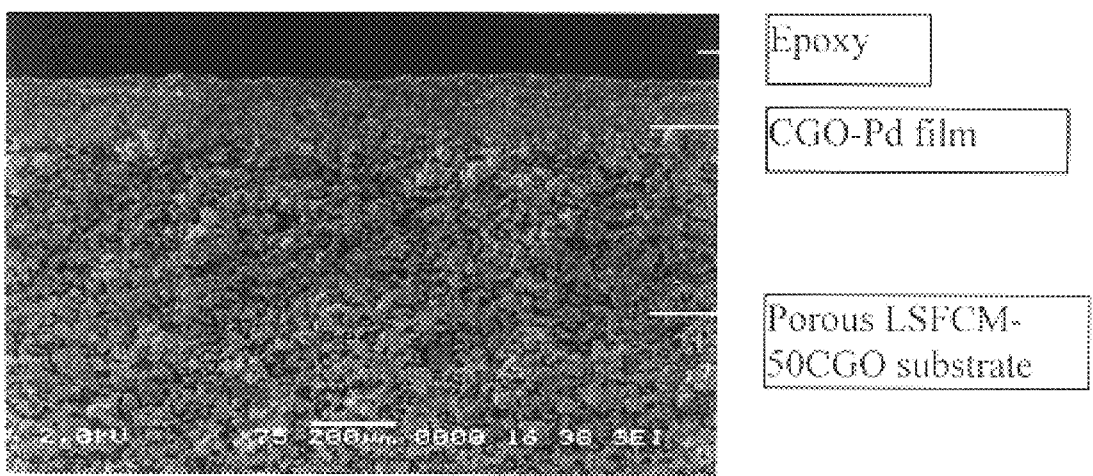
FIG. 9 is a cross-sectional scanning electron microscopy ("SEM") representation of a CGO-Pd coating deposited by Mach II plasma spraying of a mixture of CGO and 40 weight percent of palladium on a porous LSFCM-50CGO substrate in accordance with Example 6. This SEM representation depicts an approximately 200 microns thick, dense, crack-free uniform CGO-Pd coating on the porous LSFCM-50CGO substrate.

FIG. 9 shows a cross-sectional SEM of the CGO-Pd film deposited on a porous LSFCM-50CGO substrate. The CGO-Pd film was dense and crack-free with a thickness of about 200 microns. Higher SEM observations reveal that both CGO and Pd deposits are uniformly distributed in the coating. The film was also well bonded with the porous substrate, as shown in FIG. 9.

Example 7

Deposition of $Ce_{0.8}Gd_{0.2}O_2$ (CGO) ionic conducting film by subsonic plasma spraying using a nanocrystalline agglomerate powder.

The CGO coating was prepared by subsonic-mode plasma spraying on a porous LSFCM-50CGO substrate. The sprayed-dried CGO powder was fed into the torch in the same way as described in the example 1. A subsonic mode of plasma spraying was set up as follows:

Plasma Medium:

45 slm Ar with 21 slm He, where slm is standard liters per minutes.

Plasma Torch and Power:

Subsonic mode of Praxair SG-100 plasma torch with a power of 900 amps, 29 volts and 32 Kilowatts.

Powder and Feed:

The CGO powder (20 μm agglomerates of 200 nm primary particles) is prepared by Praxair Specialty Ceramics, Inc. Powder was feed at 10 mm upstream from the torch exit with 4 slm Ar carrier gas at 30 psi and with a 3.0 rpm setting of Praxair powder feeder (equals approximately to 18 grams/minute feed rate).

Torch Manipulation:

Fourteen passes at a scan of 500 mm/second in a 3 mm step ladder pattern horizontal to the substrate and at a distance of 90 mm from the substrate.

Figure 10:
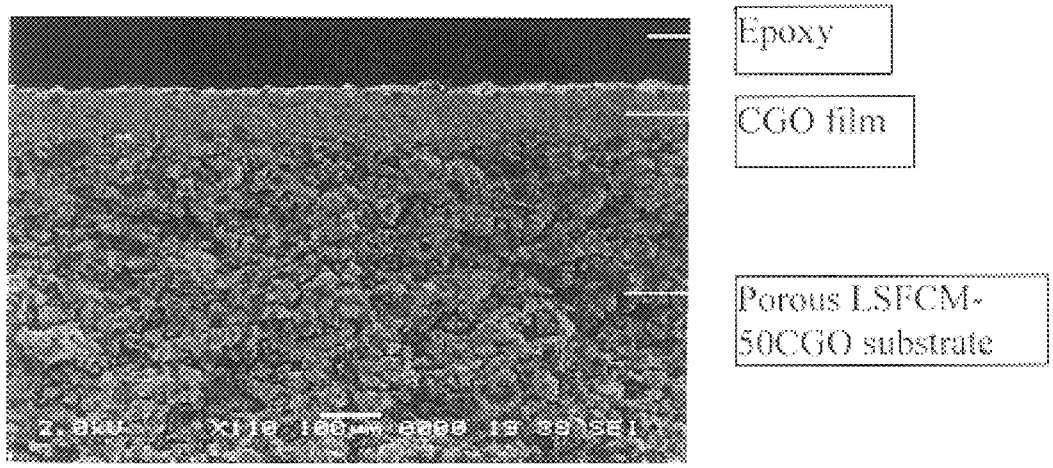
FIG. 10 is a cross-sectional scanning electron microscopy ("SEM") representation of a CGO coating deposited by subsonic plasma spraying of a mixture of CGO on a porous LSFCM-50CGO substrate in accordance with Example 7. This SEM representation depicts an approximately 100 microns thick, dense, crack-free uniform CGO coating on the porous LSFCM-50CGO substrate.

FIG. 10 shows a cross-sectional SEM of the CGO film deposited on a porous LSFCM-50CGO substrate. The film was dense and crack-free with a thickness of about 100 microns. The film was uniform in thickness with no lamellar structure detected and was well bonded with the porous substrate.

Example 8

Deposition of Porous $La_{0.2}Sr_{0.8}Fe_{0.79}Cr_{0.2}Mg_{0.01}O_3$ (LSFCM) Coating by Subsonic Plasma Spraying.

The porous LSFCM coating was prepared by subsonic-mode plasma spraying on a porous LSFCM-m (LSFCM+20 wt. % Pd/Ag). The sprayed-dried LSFCM powder used in this example was first blended with 15 wt. % graphite (pore former) and then fed into the plasma spray gun vertically via Ar carrier gas through a Praxair powder feeder. A subsonic mode of plasma spraying was set up as follows:

Plasma Medium:

40 slm Ar with 16 slm He, where slm is standard liters per minutes.

Plasma Torch and Power:

Subsonic mode of Praxair SG-100 plasma torch with a power of 800 amps, 35 volts and 28 Kilowatts.

Powder and Feed:

LSFCM powder (20 μm agglomerates) is prepared by Praxair Specialty Ceramics, Inc. The powder was pre-mixed with 15 wt. % graphite and then fed at 10 mm upstream from the torch exit with 4 slm Ar carrier gas at 30 psi and with a 3.0 rpm setting of Praxair powder feeder (equals approximately to 18 grams/minute feed rate).

Torch Manipulation:

Sixteen passes at a scan of 500 mm/second in a 3 mm step ladder pattern horizontal to the substrate and at a distance of 90 mm from the substrate.

Figure 11:
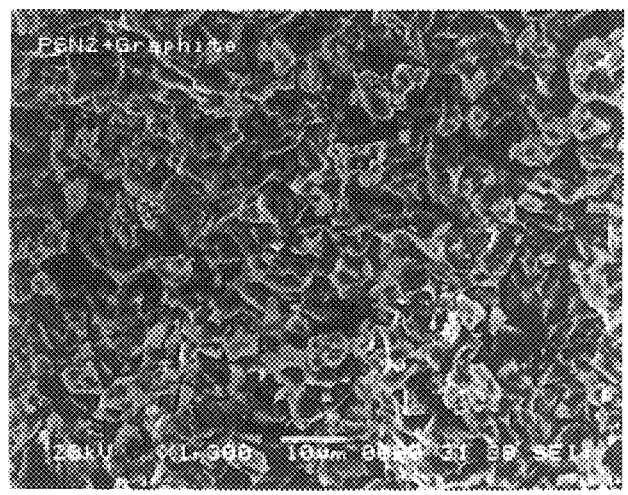
FIG. 11 is a cross-sectional photomicrograph representation at 500×magnification of a LSFCM coating deposited by subsonic plasma spraying on a LSFCM-m (consisting of LSFCM plus 20 wt. percent of Pd/Ag) substrate in accordance with Example 8. This photomicrograph representation depicts a 200 microns thick, porous coating having a porosity of greater than 30 percent and a pore size of greater than 10 microns.

By selecting an appropriate set of plasma spraying parameters and using the powder blended with certain amount of pore former (graphite), a porous OTM coating can be obtained. FIG. 11 shows a cross-sectional photomicrograph of porous LSFCM coating deposited on a porous LSFCM-m substrate. A porosity of more than 30% with the pore sizes of up to 10 micron was obtained on the LSFCM coating. It should be pointed out that this process can be easily modified to obtain a porosity >50% and a pore size >50 μm of the porous coating depending on spraying conditions and pore former used.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A method of fabricating a mixed ionic and electronic conducting membrane layer comprising:

feeding a single phase composition made up of agglomerates of particles to a plasma torch or gun, the particles within the agglomerates comprising a mixed ionic and electronic conducting material and having a particle size of less than 1000 nm;

spraying said single phase composition in the presence of an inert gas as a plasma medium, at a supersonic speed from said plasma torch or gun; and depositing said single phase composition onto said porous or dense substrate in order to provide the electronic or ionic or mixed ionic and electronic conducting membrane layer in the form of a microcrack-free coating on the porous or dense substrate.

2. The method of claim 1 wherein said plasma medium comprises argon, helium, or a combination thereof.

3. The method of claim 1 wherein said particles comprise perovskite particles.

4. The method of claim 1 wherein said particles comprise fluorite particles.

5. The method of claim 1 wherein the particle size within the agglomerate is less than 200 nm.

* * * * *